(12) United States Patent
Shin et al.

(10) Patent No.: US 6,920,123 B1
(45) Date of Patent: Jul. 19, 2005

(54) CELL SEARCH METHOD IN WIRELESS COMMUNICATION NETWORK

(75) Inventors: Hong Sup Shin, Kyonggi (KR); Yong Hoon Lim, Kyonggi-do (KR)

(73) Assignee: LG Information & Communications, Ltd., Seoul (KR)

(*) Notice: Subject to any disclaimer, the term of this patent is extended or adjusted under 35 U.S.C. 154(b) by 0 days.

(21) Appl. No.: 09/478,496

(22) Filed: Jan. 6, 2000

(30) Foreign Application Priority Data

Feb. 6, 1999 (KR) .......................................... 4106-1999

(51) Int. Cl.[7] .............................. H04B 7/216; H04J 3/06
(52) U.S. Cl. ...................... 370/335; 370/342; 370/509
(58) Field of Search ................................ 370/335, 342, 370/324, 350, 503, 504–509, 510–512, 513, 514, 515; 375/350, 366, 354, 144, 150

(56) References Cited

U.S. PATENT DOCUMENTS

| | | | | |
|---|---|---|---|---|
| 5,930,366 | A | * 7/1999 | Jamal et al. | ................. 370/509 |
| 5,991,330 | A | * 11/1999 | Dahlman et al. | ........... 370/509 |
| 6,185,244 | B1 | * 2/2001 | Nystrom et al. | ............ 375/145 |
| 6,480,558 | B1 | * 11/2002 | Ottosson et al. | ............ 375/350 |
| 6,504,830 | B1 | * 1/2003 | Ostberg et al. | ............. 370/342 |
| 6,526,091 | B1 | * 2/2003 | Nystrom et al. | ............ 375/142 |
| 6,539,032 | B2 | * 3/2003 | Rudolf | ........................ 370/503 |
| 6,665,277 | B1 | * 12/2003 | Sriram | ........................ 370/342 |

* cited by examiner

*Primary Examiner*—Ricky Ngo
*Assistant Examiner*—Andy Lee
(74) *Attorney, Agent, or Firm*—Fleshner & Kim, LLP (57) ABSTRACT

Cell search method in an asynchronous mobile communication network suitable for reducing a hardware complexity and a power consumption of a mobile terminal by improving a cell search method suggested to ETSI(European Telecommunications Standards Institute) presently, method including the steps of (a1) the user device obtaining a slot synchronization for every slot assigned to the first and second synchronization channels using the first synchronization signal transmitted from the base station, and detecting a position of an omitted synchronization code when there is the omitted synchronization code from a plurality of synchronization codes in the first synchronization signal, (b1) searching for a starting point of each frame assigned to the first and second synchronization channels and one base station group the base station is in use by using the second synchronization signal, and (c1) the user device determining a code for identifying the base station among the second codes used by the base station group from a position of the detected synchronization code.

16 Claims, 6 Drawing Sheets

CELL SEARCH METHOD IN WIRELESS COMMUNICATION NETWORK

BACKGROUND OF THE INVENTION

1. Field of the Invention

The present invention is related to a cell search method in a mobile communication system, and more particularly, to a cell search method in an asynchronous mobile communication network suitable for reducing a hardware complexity and a power consumption of a mobile terminal by improving a cell search method suggested to ETSI(European Telecommunications Standards Institute) presently.

2. Background of the Related Art

Depending on methods for transmitting a synchronizing signal from a base station to each mobile terminal, the next generation mobile communication network under development(IMT-2000) presently may be sorted as a synchronous mobile communication network and an asynchronous mobile communication network. Standardization of the synchronous mobile communication network is carried out centered on the U.S.A, while the asynchronous mobile communication network is carried out centered on the Europe.

In the asynchronous mobile communication network, when a mobile terminal MT is turned on at an initial state, the mobile terminal should select one base station from a plurality of base stations around the mobile terminal, which can support the best communication service to the mobile terminal as soon as possible. To do this, the mobile terminal receives all synchronizing signal available at first to establish a synchronization with each of the base stations which transmit the synchronization signals, that is call an initial cell search in technical words. During the cell search, each mobile terminal searches for a cell and determines the downlink scrambling code and frame synchronization of corresponding cell. The cell search is typically carried out in three steps as described in the technical specification(TS S1.01 v2.0.0(1999–04)).

During the first step of the cell search procedure, the mobile terminal(MT) uses the SCH's primary synchronization code to acquire slot synchronization to a cell. This is typically done with a single matched filter(or any similar device) matched to the primary synchronization code which is common to all cells. The slot timing of the cell can be obtained by detecting peaks in the matched filter output.

During the second step of the cell search procedure, the MT uses the SCH's secondary synchronization code to find a frame synchronization and identify the code group of the cell found in the first step. This is done by correlating the received signal with all possible secondary synchronization code sequences, and identifying the maximum correlation value. Since the cycle shifts of the sequences are unique the code group as well as the frame synchronization is determined.

During the third and last step of the cell search procedure, the MT determines the exact primary scrambling code by the found cell. The primary scrambling code is typically identified through symbol by symbol correlation over the primary CCPCH(Common Control Physical Channel) can be detected, super-frame synchronization can be acquired and the system and cell specific BCH(Broadcast channel) information can be read.

Such a cell search procedure is carried out by a cell searcher provided to the mobile terminal, wherein, in order to carry out the third step, 16 correlators are used in correlating in parallel. That is, 16 synchronization code which belong to a code group detected in the second step are provided to the 16 correlators respectively, to execute correlation in symbol units. Of course, the cell searcher may be provided with, not the 16 correlators, but one correlator, to execute the correlation in series. However, in this case, the total correlation time period takes a too long time period in comparison to the parallel method, which is not practicable.

However, many users prefer a mobile terminal which, in view of functions, can make fast processing of information and provide a variety of functions, consumes less power, and, in view of shape, has a smaller size and is thinner. Under these communication environment, the cell searcher and the cell search method of the related art mobile terminal have limitations in reducing hardware basis complexity and a power consumption of a channel which provides a synchronization signal.

SUMMARY OF THE INVENTION

Accordingly, the present invention is directed to a cell search method in an asynchronous mobile communication network that substantially obviates one or more of the problems due to limitations and disadvantages of the related art.

An object of the present invention is to provide device and method for transmission of a synchronization signal in an asynchronous mobile communication network, which can make a fast cell search.

Another object of the present invention is to provide device and method for searching a cell in an asynchronous mobile communication network, which can make a fast cell search while a hardware based complexity is reduced.

Other object of the present invention is to provide a device for transmission of a synchronization signal and a device for searching a cell in an asynchronous mobile communication network, which can reduce a power consumption of a channel which provides a synchronization signal from a base station to each mobile terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for transmitting a synchronization signal in an asynchronous wireless communication system having at least one synchronization channel provided between each user device and a base station for transmitting the synchronization signal having a plurality of synchronization codes from the base station to each user device periodically, the method includes the step of omitting at least one particular synchronization code from the plurality of synchronization codes when the base station transmits the synchronization codes.

In other aspect of the present invention, there is provided a method of searching for a cell in an asynchronous wireless communication system having at least two or more than two first and second synchronization channels provided between each user device and a base station for transmitting a first synchronization signal having a plurality of first synchronization codes and the second synchronization signal having a plurality of second synchronization codes from the base station to each user device periodically, the method including the steps of (a1) the user device obtaining a slot synchronization for every slot assigned to the first and second synchronization channels using the first synchronization signal transmitted from the base station, and detecting a position of an omitted synchronization code when there is the omitted synchronization code from a plurality of synchronization codes in the first synchronization signal, (b1) searching for a starting point of each frame assigned to the first and second synchronization channels and one base station group the base station is in use by using the second synchronization signal, and (c1) the user device determining a code for identifying the base station among the second codes used by the base station group from a position of the detected synchronization code.

In another aspect of the present invention, there is provided a base station transmission device in an asynchronous wireless communication network, the base station transmission device for transmitting a synchronizing signal having a plurality of synchronization codes through at least one switching device, wherein a central processing unit in the base station transmission device controls the switching device such that at least particular one of the plurality of synchronization codes is omitted in transmission of the synchronization signal.

In further aspect of the present invention, there is provided a device of searching for a cell in an asynchronous wireless communication network including a slot synchronization obtaining unit for receiving the first synchronization signal having a plurality of synchronization codes transmitted through a synchronization channel provided to the communication network from a base station, obtaining a slot synchronization for every slot assigned to the synchronization channel, and detecting a slot position having a least correlation value from correlation values for respective slots obtained in the step for obtaining the slot synchronization with reference to a starting point of frame obtained in the step of searching for a starting point of every frame, a frame synchronization and base station group determining unit belonging to one of base station groups for receiving a second synchronization signal having a plurality of code sequences from the base station and detecting a starting point of every frame and one base station group to be used by the base station, both assigned to the synchronization channel, a CPU(Central Processing Unit) for detecting a position of an omitted synchronization code with reference to the starting point of a frame using the least correlation value for the plurality of synchronization codes in the first synchronization signal, and a code determining unit for determining a code used by the base station among the plurality of codes contained in the base station groups according to positional information on the omitted synchronization code.

By omitting a preset number of synchronization codes or symbols at preset positions in a synchronization signal at respective base stations in transmitting the synchronizing signal having a plurality of synchronization codes, the cell searcher in the user device can detect a scrambling code used in the base station presently from 16 scrambling codes with easy by using positional information on the symbols omitted from the synchronization signal transmitted from the base station. That is, in the third step in a cell search process, the positional information on the omitted synchronization codes or symbols is used for detecting the scrambling code used by the base station presently by using only one or two correlators. Preferably, a number of the omitted synchronization code or symbol is one or two, but more than two may be used.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
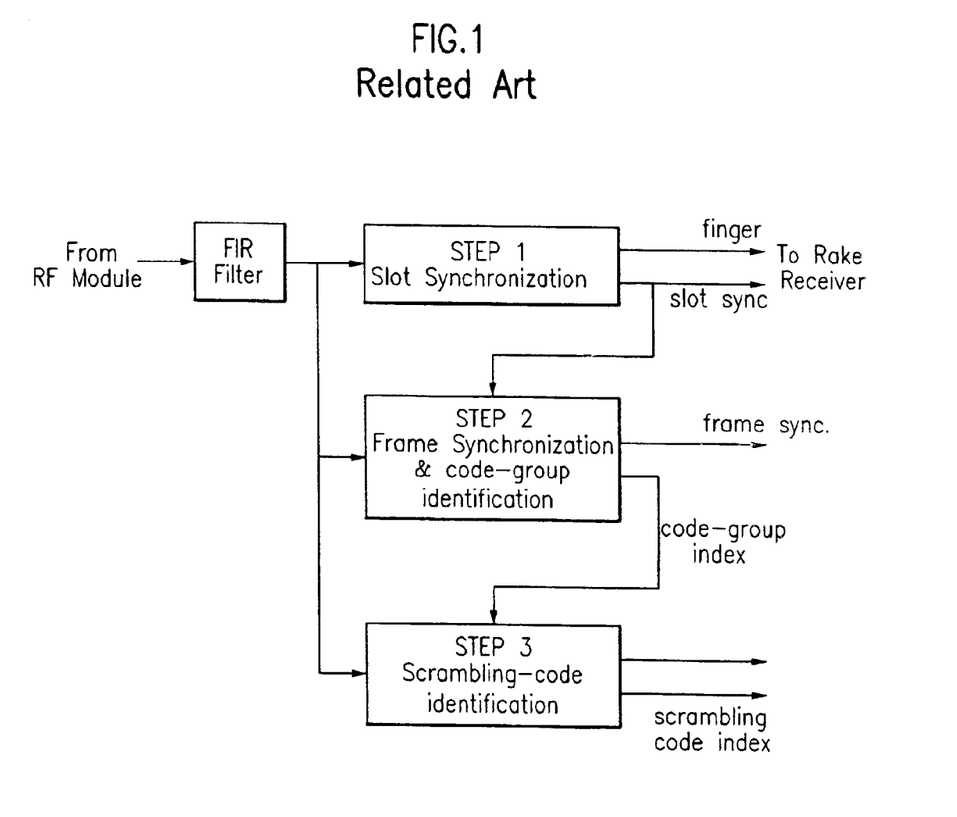
FIG. 1 illustrates a flow chart showing a related art initial cell search procedure.
Figure 2:
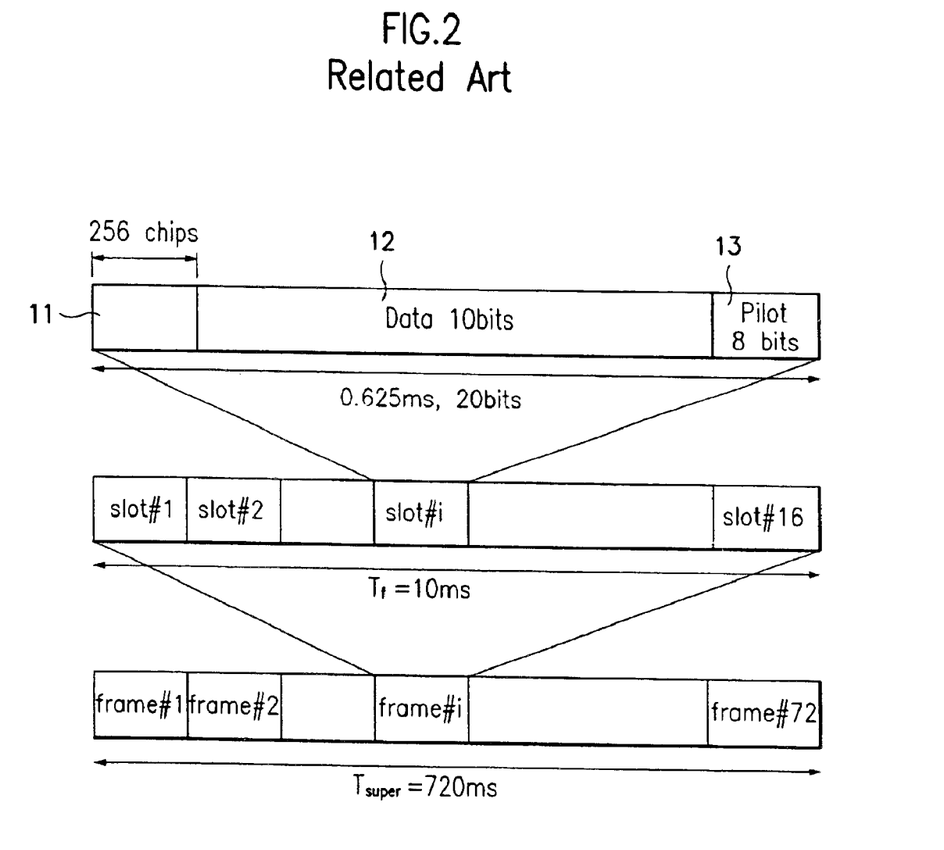
FIG. 2 illustrates a frame structure for PCCPCH(Primary Common Control Physical Channel) which is currently suggested in ETSI.

Reference will now be made in detail to the preferred embodiments of the present invention, examples of which are illustrated in the accompanying drawings. FIG. 2 illustrates a frame structure for PCCPCH(Primary Common Control Physical Channel) which is currently suggested in ETSI.

Referring to FIG. 2, the mobile communication network of the present invention includes the CCPCH suggested to ETSI. The CCPCH is a fixed rate(32 kbps, SF=256) downlink physical channels used to carry a BSC(Broadcast Channel). The CCPCH includes a super frame having 72 unit frames which is provided repetitively, each unit frame with 16 slots, each slot with 256 chips of synchronization signal fields 11, 10 bits of data fields 12 and 8 bits of pilot fields 13. And, as shown in FIG. 3, each synchronization signal field 11 is provided with an SCH1 (Primary Synchronization Channel 1) and an SCH2(Secondary Synchronization Channel 2) from the base station through different channels on the same time.

Figure 3:
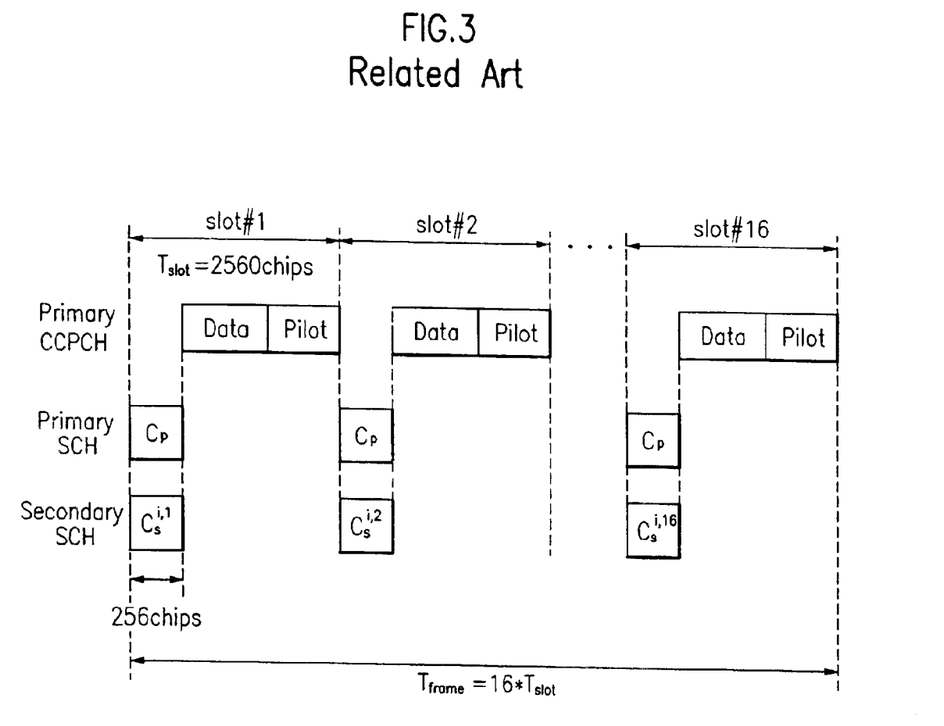
FIG. 3 illustrates a structure of a synchronization channels (SCH1 and SCH2) which are currently suggested in ETSI.

FIG. 3 illustrates a structure of a synchronization channels (SCH1 and SCH2) which are currently suggested in ETSI. Cp denotes a primary synchronization code, and $C_s^{j,k}$ denotes one of 17 possible secondary synchronization codes. The primary SCH consists of an unmodified code of length 256 chips, the primary synchronization code, transmitted once every slot. The primary synchronization code is the same for every cell in the system and is transmitted time-aligned with the period where the primary common control physical channel(CCPCH) is not transmitted.

While, the secondary SCH consists of repeatedly transmitting a length 16 sequences of unmodulated codes of length 256 chips, the secondary synchronization code, transmitted in parallel with the primary synchronization channel.

Each secondary synchronization code is chosen from a set of 17 different codes of length 256. This sequence on the secondary SCH indicates which of the 32 different code groups the cell's downlink scrambling code belongs 32 sequences are used to encode the 32 different code groups each containing 16 scrambling codes.

Figure 4:
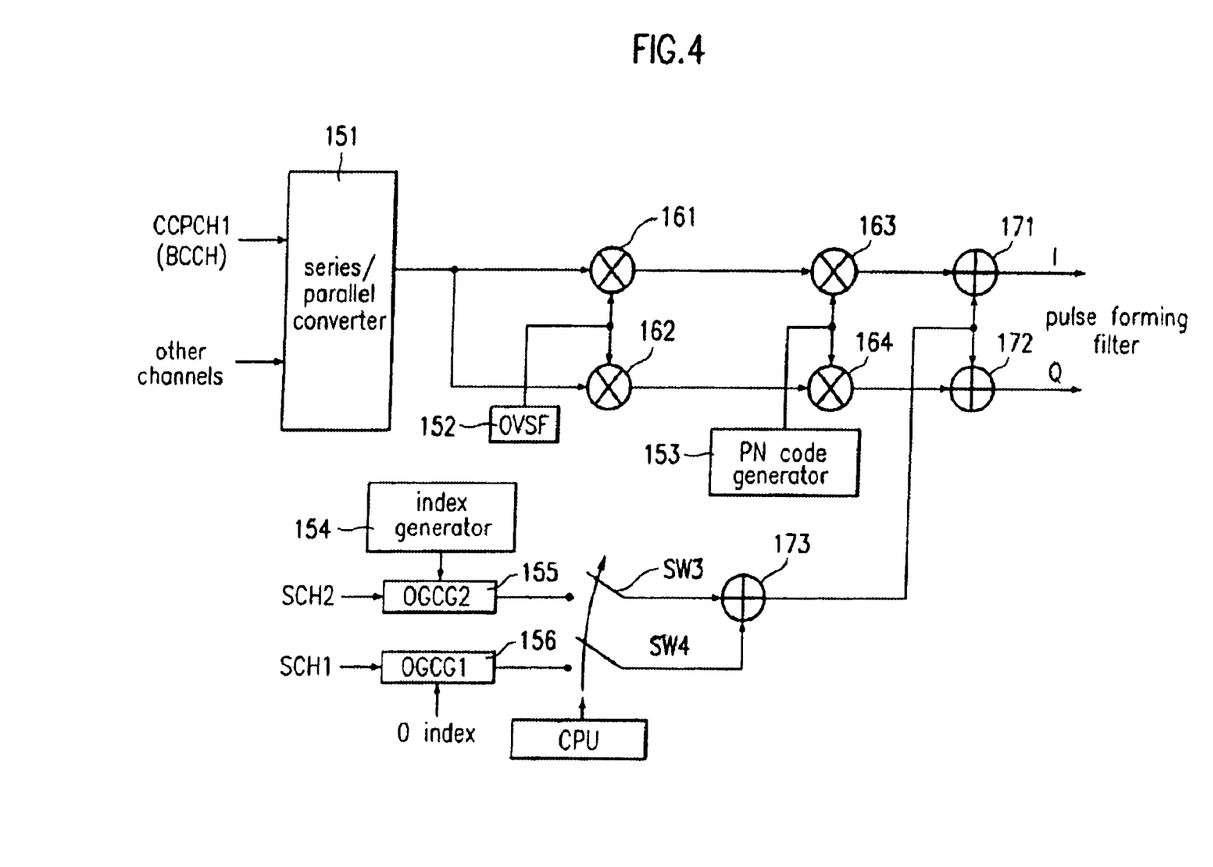
FIG. 4 illustrates a block diagram of a base station transmission device in a mobile communication network of the present invention.

FIG. 4 illustrates a block diagram of a base station transmission device in a mobile communication network of the present invention.

Referring to FIG. 4, in a case a synchronization signal SCH1 consisting of 16 synchronization code Cp is transmitted through a switch device SW3 and SW4 from the base station transmission device of the present invention, a CPU in the base station controls the switch device SW3 and SW4, to omit, preferably, one or two specific synchronization codes Cp among the 16 synchronization codes Cp in the synchronization signal SCH1.

Figure 5:
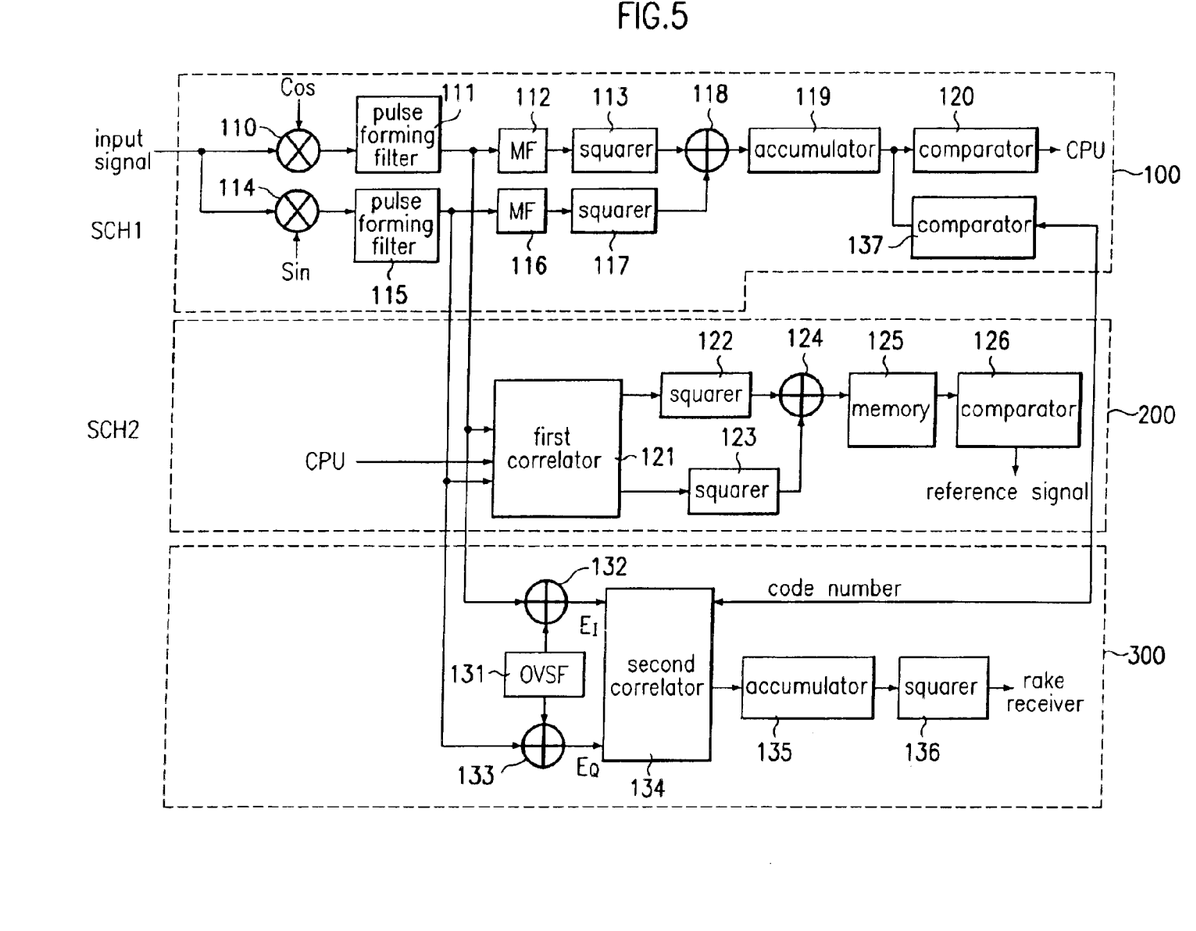
FIG. 5 illustrates a block diagram of a cell searcher provided to a mobile terminal in a mobile communication network of the present invention; and, FIGS. 6A and 6B illustrate synchronization channel structures provided from a base station of the related art and the present invention, respectively.

FIG. 5 illustrates a block diagram of a cell searcher provided to a mobile terminal in a mobile communication network of the present invention.

Referring to FIG. 5, the cell searcher provided to a mobile terminal of the present invention includes a slot synchronization obtaining unit 100 for receiving the first synchronization signal SCH1 having 16 synchronization codes Cp transmitted through a synchronization channel provided to a communication network from a base station, obtaining a slot synchronization for every slot assigned to the synchronization channel, and determining a least correlation value at a position of each slot where an accumulative value for entire slots of a correlation value for each slot shows the maximum value, a frame synchronization and base station group determining unit 200 falling on one of 32 base station group for receiving a second synchronization signal SCH2 having a sequence of 16 codes from the base station and detecting a starting point of every frame and one base station group to be used by the base station, both assigned to the synchronization channel, a CPU(Central Processing Unit) for determining a position of an omitted synchronization code Cp with reference to the starting point of a frame using the least correlation value for the 16 synchronization codes in the first synchronization signal SCH1, and a code determining unit 300 for determining a scrambling code used by the present base station of 16 scrambling codes contained in the base station groups according to the omitted synchronization code Cp. Though the related art code determining unit 300 should be provided with 16 correlators without fail, the number of the correlators required in the present invention is the same as a number of the omitted synchronization codes Cp in the first synchronization signal SCH1 transmitted from the base station. For example, if the omitted synchronization code Cp in the first synchronization signal SCH1 transmitted from the base station is one, only one correlator is required.

There are matters to be defined in view of system before a synchronization signal transmission and cell search procedure of the present invention are proceeded.

First of all, positions of the omitted synchronization codes Cp should not be duplicated between adjacent base stations which belong to the same base station group assigned to the mobile station network. And, when it is intended that a particular synchronization code(s) Cp is (are) omitted from the mobile communication network, the synchronization code Cp of a preset number at preset positions are omitted from the synchronization signal SCH1 used by itself, and the mobile terminal should be able to identify a relevant base station by the number of the omitted particular synchronization codes and the omitted positions of the particular synchronization codes in the first synchronization codes Cp.

A method for transmitting a synchronization signal and a cell search method in accordance with a first preferred embodiment of the present invention will be explained with reference to the attached drawings.

Figure 6A:
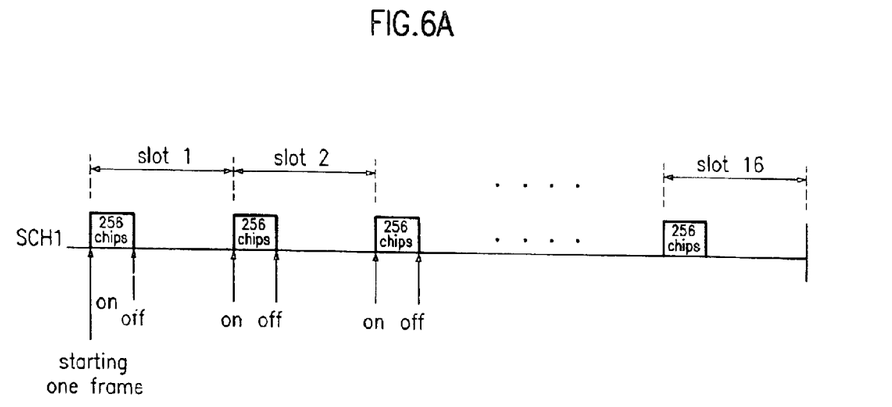
Figure 6B:
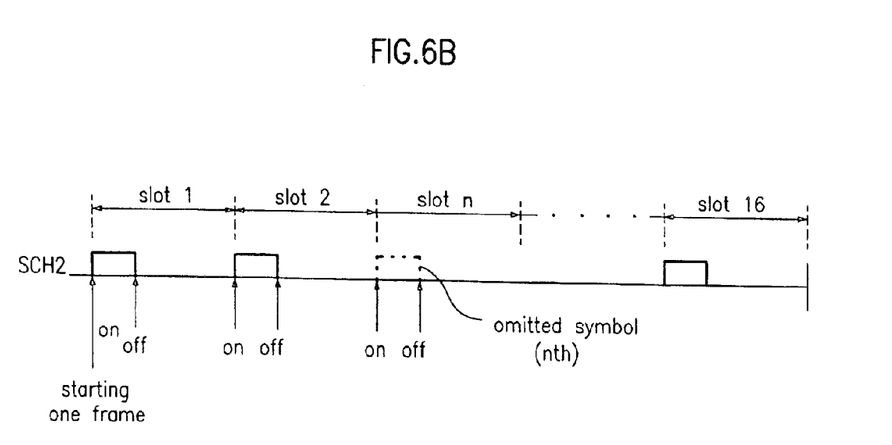

The base station transmission device shown in FIG. 4 periodically transmits two synchronization signals SCH1 and SCH2 and a CCPCH(Common Control Physical Channel) to all mobile terminals in its own cell regions. The CCPCH is transmitted through a series/parallel converter 151, multipliers 161~164 and adders 171 and 172 shown in FIG. 4, and the two synchronization signals SCH1 are SCH2 are transmitted through the switch devices SW3 and SW4 after passing through two orthogonal gold code generator OGCG1 and OGCG2 155 and 156 respectively, together with the CCPCH. The switching control for the switch devices SW3 and SW4 is made by the CPU provided in the base station. As shown in FIG. 4, the index generator 154 connected to the OGCG2(Orthogonal Gold Code Generator) 155 generates 17 indices of a particular base station group in a sequence among entire 256 indices. In this instance, the CPU makes a switching control such that no symbol is transmitted at (N)th synchronization code Cp in the first synchronization signal SCH1 having the 16 synchronization codes Cp. In this instance, the switches SW3 and SW4 in FIG. 4 are brought into a turned off state, so that no symbol is transmitted at the (N)th synchronization code Cp as shown in FIG. 6. Therefore, the mobile terminal receives the first synchronization signal SCH1 transmitted from the base station, and detects a fact that the (N)th synchronization code Cp has been omitted from the 16 synchronization codes Cp in the first synchronization signal, to know with easy that the base station presently uses the (N)th code among the 16 scrambling codes belonging to a particular base station group.

A cell search procedure by a mobile terminal when a base station transmits a first synchronization signal with a particular synchronization signal omitted therefrom in the method explained in association with FIG. 4 will be explained with reference to FIG. 5 in more detail.

In a first step, the mobile terminal obtains a slot synchronization for every slot assigned to a synchronization channel using a first synchronization signal SCH1 transmitted from a base station, and detects a position of an omitted synchronization code when there is the omitted synchronization code from the 16 synchronization codes in the first synchronization signal SCH1. That is, the first synchronization signal SCH1 transmitted from the base station is provided to the multipliers 110 and 114 for having a sine carrier and a cosine carrier to be multiplied thereto, respectively. An I- and Q-channel signals from the multipliers 110 and 114 are respectively passed through pulse shaping cosine filters 111 and 115 and correlated through matched filters 112 and 116 matched to an orthogonal gold code. The I- and Q-channel signals from the matched filters 112 and 116 are squared in squarers 113 and 117, and stored in an adder 118. In such processes, correlation operations are repeated over the 16 slots assigned to unit frames, and results of the operations are accumulated in the accumulator 119 continuously through the adder 118. Then, the accumulator 119 forwards an accumulated correlation value of one frame unit to a comparator 120. The comparator compares the correlation values in a sequence to detect a positional information for a starting point of a slot which has the greatest correlation value. The comparator 120 finds out a greatest correlation value from correlation values that are greater than a particular critical value provided from the accumulator 119, which is taken as the very starting point of the slot. If there is no correlation value that is greater than a particular critical value, the CPU controls such that the first step is repeated, again. And, in the present invention, an output of the accumulator 119 is also provided to other comparators 137 on the same time. The comparator 137 compares correlation values on symbols in the 16 slots received in sequence, to detect positional information of a synchronization code Cp having the least correlation. If (N)th synchronization code Cp shows the least correlation value, the synchronization code used by the base station is an (N)th synchronization code in a base station group determined in a second step.

In a second step, a cell searcher in the mobile terminal searches for a starting point of every frame assigned to the synchronization channel and one base station group the base station is in use by using a second synchronization signal SCH2. That is, as shown in FIG. 5, the second synchronization signal SCH2 is provided to the matched filters 112 and 116 pertinent to respective codes, to find matched code sequences. The found code sequences are compared to a code sequence table for 32 base station groups, the present base station group and the starting point of a frame can be found.

Therefore, in the third step, a scrambling code the present base station is in use can be found by using the omitted synchronization code Cp found in the first step and the information on the starting point of a frame found in the second step. For example, in a case when a position of the synchronization code Cp having the least correlation value is (N)th one, and an output of a correlator in the second correlator unit 134 using the (N)th code is greater than a critical value, it is determined that an appropriate code is found. However, the output of a correlator in the second correlator unit 134 using the (N)th code is not greater than the critical value, the aforementioned process is repeated again using a correlator having a code corresponding to a slot for the second least value.

According to a cell search simulation explained above, a probability that the cell searcher finds a scrambling code in use at the present base station at first is greater than 90%, and at second is greater than 99%. Accordingly, if the transmission device in the base station provides no symbol to the (N)th slot among an entire slots, the cell searcher in the mobile terminal can detect which scrambling code the present base station uses with easy using the information.

In the present invention, when the first synchronization signal is transmitted from the base station, a number of the second correlator 134 shown in FIG. 5 can be provided in proportion to a number of omitted synchronization codes. For example, when the base station transmission device transmits the first synchronization signal SCH1, if only one synchronization code Cp is omitted, the second correlator unit 134 in the cell searcher in the mobile terminal can search for the scrambling code used in the present base station only by using one correlator with easy. Therefore, in comparison to the related art in which 16 correlators are provided to make correlation in parallel, the present invention is provided with the least correlators, that permits to reduce complexity of hardware in the mobile terminal, significantly.

And, as another embodiment of the present invention, when the first synchronization signal SCH1 is transmitted from the base station to a mobile terminal in its own cell, a cell search operation of a cell searcher provided in the mobile terminal will be explained for a case more than two synchronization codes are omitted from the 16 synchronization codes Cp.

First, in a case more than two synchronization codes are omitted from entire 16 synchronization codes Cp in one slot, the entire synchronization code is divided into groups identical to a number of the synchronization code Cp to be omitted, and particular synchronization codes are omitted from positions of identical synchronization codes in the divided groups(for example, when two synchronization codes are omitted, (N)the and (N+8)th positions, where N is below 8). Positions of omission of the synchronization codes Cp and a number of omitted synchronization codes Cp are given to each base station properly in view of entire system.

In a first step of the cell search, the cell searcher in the mobile terminal obtains a slot synchronization for every slot assigned to a synchronization channel by using a first synchronization signal SCH1 transmitted from a base station in the same method with the first embodiment of the present invention, and detects positions of omitted synchronization codes when there are omitted synchronization codes from the 16 synchronization codes Cp in the first synchronization signal SCH1.

In the second step, a second synchronization signal SCH2 is used in searching for a starting point of each frame and one base station group in use presently from 32 base station groups. Then, the second synchronization signal SCH2 is provided to matched filters 112 and 116 pertinent to respective codes, to find matched code sequences. Provided that the found code sequences are compared to an orthogonal gold sequence table for the 32 base station groups, the one base station group in use presently and a frame starting point can be found.

Accordingly, in the third step, the information obtained in the second step and the positional information of the synchronization codes Cp having the least correlation value transmitted from the first step are used in finding a scrambling code the present base station is in use. The accumulator 135 in FIG. 5 divides entire synchronization codes into a number of groups the same with the omitted synchronization codes, and combines correlation values of synchronization codes at the same positions in the divided groups. Then, the CPU detects a relative position from the starting point of the frame corresponding to the slot having the least correlation value among the combined correlation values. And, a scrambling code the present base station is in use is determined according to the detected positional information. If two synchronization codes Cp are omitted in transmission of the first synchronization signal SCH1 from the base station, the second correlator unit 134 in FIG. 5 can detect the scrambling code the present base station is in use with easy by using only two correlators. According to the aforementioned cell search simulation in accordance with another embodiment of the present invention, a probability that the cell searcher in the mobile terminal can find the scrambling code at first is greater than 99%. The second embodiment of the present invention can improve a link performance since an SCH1 forward power which is smaller than the first embodiment. On the contrary to this, the second embodiment has more or less complex hardware than the first embodiment because the second embodiment employs two or more than two correlators.

As has been explained, the cell search method of the present invention has the following advantages.

By not transmitting one or more synchronization codes Cp from 16 synchronization codes Cp in a first synchronization signal SCH1 transmitted from a base station to a mobile terminal, the mobile terminal can use positional information on the omitted synchronization codes Cp in searching a cell faster and more exactly than the case of the related art, permitting to reduce an amount of calculation and calculation time period of the mobile station required for searching a cell in comparison to the related art significantly, as well as power consumption of the mobile terminal.

And, the minimization of a number of correlators required in the third step of the cell search permits to reduce hardware complexity of the mobile terminal. Therefore, application of the present invention to the mobile terminals and base stations which are in trends of being fabricated smaller and consuming less power.

It will be apparent to those skilled in the art that various modifications and variations can be made in the cell search method of the present invention without departing from the spirit or scope of the invention. Thus, it is intended that the present invention cover the modifications and variations of this invention provided they come within the scope of the appended claims and their equivalents.

What is claimed is:

1. A method for transmitting a synchronization signal in an asynchronous wireless communication system having at least one synchronization channel transmitted by a base station for transmitting a first synchronization signal $C_p$ having a plurality of synchronization codes from the base station to each user device periodically, the method comprising:

omitting at least one particular synchronization code from the plurality of synchronization codes when the base station transmits the synchronization codes, wherein positions of the omitted synchronization codes are set such that the positions are not overlapped between adjacent base stations which belong to the same base station group assigned to the wireless communication network.

2. A method as claimed in claim 1, wherein when the synchronization code is omitted from the synchronization signal, the synchronization code of a preset number is omitted from a preset position of the synchronization signal.

3. A method for transmitting a synchronization signal in an asynchronous wireless communication system having at least one synchronization channel transmitted by a base station for transmitting a first synchronization signal $C_p$ having a plurality of synchronization codes from the base station to each user device periodically, the method comprising:

omitting at least one particular synchronization code from the plurality of synchronization codes when the base station transmits the synchronization codes, wherein, in a case at least two synchronization codes are omitted from the synchronization signal, the base station divides entire synchronization codes into a number of groups equal in number to a number of the omitted synchronization codes.

4. A method of searching for a cell in an asynchronous wireless communication system having at least two or more than two first and second synchronization channels provided between each user device and a base station for transmitting a first synchronization signal having a plurality of first synchronization codes and a second synchronization signal having a plurality of second synchronization codes from the base station to each user device periodically, the method comprising the steps of:

(a1) the user device obtaining a slot synchronization for every slot assigned to the first and second synchronization channels using the first synchronization signal transmitted from the base station, and detecting a position of an omitted synchronization code when there is the omitted synchronization code from a plurality of synchronization codes in the first synchronization signal;

(b1) searching for a starting point of each frame assigned to the first and second synchronization channels and one base station group the base station is in by using the second synchronization signal; and, (c1) the user device determining a code for identifying the base station among the second codes used by the base station group from the position of the detected synchronization code.

5. A method as claimed in claim 4, wherein the step for detecting an omitted position of the first synchronization code uses a position of slot having a minimum correlation value among correlation values for slots obtained in the step of obtaining slot synchronization in the step a1) with reference to the frame starting point obtained in the step b1).

6. A method as claimed in claim 4, wherein the user device identifies a desired base station by receiving the first synchronization signal having a plurality of first synchronization codes transmitted from the base station and detecting a number and positions of omitted first synchronization codes from the plurality of first synchronization codes.

7. A method as claimed in claim 4, wherein, in a case when there are more than two omitted synchronization codes, the step of detecting a position of an omitted synchronization code includes the steps of;

the user device correlating the plurality of first synchronization codes in the first synchronization signal in sequence, the user device dividing entire synchronization codes into a number of groups identical to a number of omitted synchronization codes, and combining correlation values of the synchronization codes at identical positions of the divided groups, detecting a relative position of a slot having the smallest correlation value from the combined correlation values with reference to a starting point of a frame containing the slot, and determining the code according to the positional information.

8. A method of searching for a cell in an asynchronous wireless communication system having at least two or more than two first and second synchronization channels provided between each user device and a base station for transmitting a first and a second synchronization signals each having a plurality of symbols to each user device periodically, the method comprising the steps of:

the base station erasing at least one particular symbol from a plurality of symbols in the first synchronization signal before the base station transmits the first synchronization signal;

the user device using the first synchronization signal transmitted from the base station in obtaining a slot synchronization for every slot assigned to the first and second synchronization channels and detecting a position of the erased symbol if there is at least one erased symbol from the plurality of symbols in the first synchronization signal;

the user device using the second synchronization signal in searching both for a starting point of every frame assigned to the first and second synchronization channels and one base station group the base station is in;

the user device determining a code used by the base station among the plurality of codes contained in the base station group with reference to the detected position of omitted symbol.

9. A method as claimed in claim 8, wherein the step for detecting an omitted position of the symbol uses a position of a slot having a minimum correlation value among correlation values for slots obtained in the step of obtaining slot synchronization with reference to the frame starting point obtained in the step of searching for a starting point of each frame.

10. A method as claimed in claim 8, wherein the user device identifies a desired base station by receiving the first synchronization signal having a plurality of first synchronization codes and detecting a number and positions of omitted first synchronization codes from the plurality of first synchronization codes.

11. A method as claimed in claim 8, wherein, in a case when there are more than two erased symbols, the step of detecting a position of an erased symbol includes the steps of;

the user device correlating the plurality of the symbols in the first synchronization signal in sequence, the user device dividing entire synchronization codes into a number of groups identical to a number of erased symbols, and combining correlation values of the symbols at identical positions of the divided groups, detecting a position of a slot having the smallest correlation value from the combined correlation values with reference to a starting point of a frame containing the slot, and determining the code according to the positional information.

12. A base station transmission device in an asynchronous wireless communication network, the base station transmission device for transmitting a synchronization signal having a plurality of synchronization codes through at least one switching device, wherein a central processing unit in the base station transmission device controls the switching device such that at least particular one of the plurality of synchronization codes is omitted in transmission of the synchronization signal, wherein the omitted one of the synchronization codes is used to identify the base station as the source of the synchronization signal.

13. A device of searching for a cell in an asynchronous wireless communication network comprising:

a slot synchronization obtaining unit for receiving the first synchronization signal having a plurality of synchronization codes transmitted through a synchronization channel provided to the communication network from a base station, obtaining a slot synchronization for every slot assigned to the synchronization channel, and detecting a slot position having a least correlation value from correlation values for respective slots obtained in the step for obtaining the slot synchronization with reference to a starting point of frame obtained in the step of searching for a starting point of every frame;

a frame synchronization and base station group determining unit belonging to one of base station groups for receiving a second synchronization signal having a plurality of code sequences from the base station and detecting a starting point of every frame and one base station group to be used by the base station, both assigned to the synchronization channel;

a CPU(Central Processing Unit) for detecting a position of an omitted synchronization code with reference to the starting point of a frame using the least correlation value for the plurality of synchronization codes in the first synchronization signal; and, a code determining unit for determining a code used by the base station among the plurality of codes contained in the base station groups according to positional information on the omitted synchronization code.

14. A device as claimed in claim 13, wherein the code determining unit includes a number of correlators the same as a number of synchronization codes omitted from the first synchronization signal transmitted from the base station.

15. A method for transmitting a synchronization signal in an asynchronous wireless communication system having at least one synchronization channel transmitted by a base station for transmitting a first synchronization signal $C_p$ having a plurality of synchronization codes from the base station to each user device periodically, the method comprising:

omitting at least one particular synchronization code from the plurality of synchronization codes when the base station transmits the synchronization codes, wherein the omitted synchronization code identifies the base station as the source of the synchronization signals.

16. The method of claim 3, wherein said at least two omitted synchronization codes are omitted from corresponding positions of the synchronization codes of the divided groups.

* * * * *